US012749499B2

United States Patent

(12) United States Patent
Chen et al.

(10) Patent No.: US 12,749,499 B2
(45) Date of Patent: Sep. 29, 2026

(54) LOW-QUALITY AUDIO DETECTION

(71) Applicant: Zoom Video Communications, Inc., San Jose, CA (US)

(72) Inventors: Yuhui Chen, San Jose, CA (US); Zhiye Chen, Xiaogan (CN); Zhaofeng Jia, Saratoga, CA (US); Shiwei Wang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 125 days.

(21) Appl. No.: 18/784,475

(22) Filed: Jul. 25, 2024

(65) Prior Publication Data

US 2026/0031097 A1 Jan. 29, 2026

(51) Int. Cl.
*G10L 21/00* (2013.01)
*G10L 25/60* (2013.01)

(52) U.S. Cl.
CPC .................................... *G10L 25/60* (2013.01)

(58) Field of Classification Search
CPC ......... B23B 5/168; H04L 65/80; G10L 15/25; G10L 25/60
USPC .......................................................... 704/270
See application file for complete search history.

(56) References Cited

U.S. PATENT DOCUMENTS

| | | | | |
|---|---|---|---|---|
| 12,047,536 B1 | 7/2024 | Rao et al. | | |
| 12,266,354 B2 * | 4/2025 | Herman | .................. | G10L 15/25 |
| 2023/0247077 A1 | 8/2023 | Yu | | |
| 2024/0112686 A1 | 4/2024 | Cutler | | |

FOREIGN PATENT DOCUMENTS

| | | | | |
|---|---|---|---|---|
| CN | 104424208 B * | 3/2018 | ......... | G06F 16/9535 |
| TW | 201801546 A * | 1/2018 | | |

OTHER PUBLICATIONS

International Search Report and Written Opinion for PCT/US2025/035133 mailed Oct. 14, 2025.

* cited by examiner

*Primary Examiner* — Md S Elahee
(74) *Attorney, Agent, or Firm* — Kilpatrick Townsend & Stockton, LLP

(57) ABSTRACT

Techniques for low-quality audio detection are provided. In an example method, a computing system joins a first client device to a first video conference including a number of connected client devices. The computing system receives, from the first client device, a first audio stream. The computing system determines, using a machine learning ("ML") model, at least one first audio quality measurement based on the first audio stream. The computing system computes a first metric for the first audio stream based on the at least one first audio quality measurement. In response to the first metric satisfying a predetermined threshold, the computing system outputs a message including first information about a first low-quality audio status associated with the first audio stream.

20 Claims, 13 Drawing Sheets

LOW-QUALITY AUDIO DETECTION

FIELD

The present application generally relates to audio processing for digital communications, and more particularly relates to techniques for low-quality audio detection.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
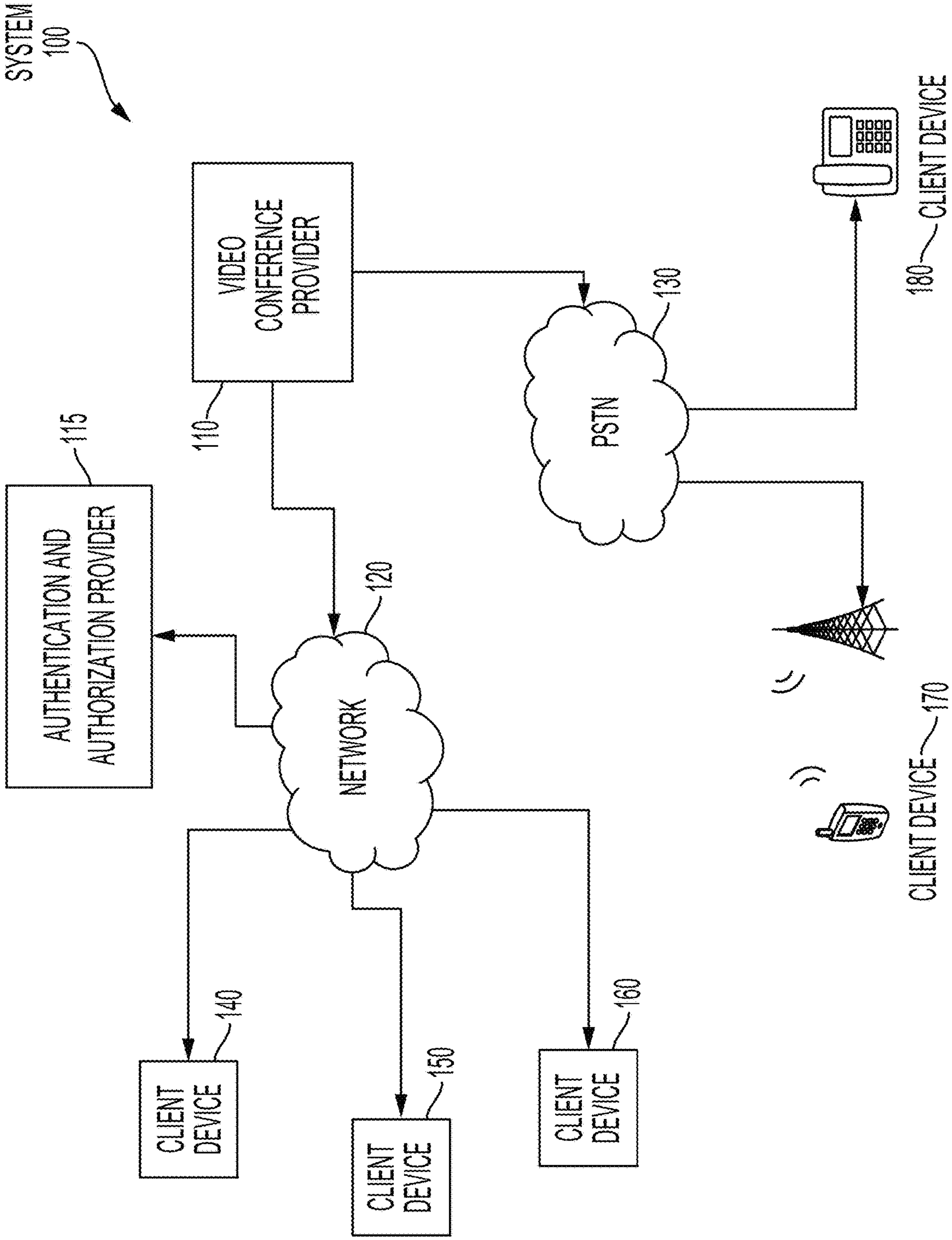
FIG. 1 shows an example system that provides videoconferencing functionality to various client devices, according to some aspects of the present disclosure.

Examples are described herein in the context of techniques for low-quality audio detection. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing, and the related constellation of communication services provided by video conferencing platforms such as chat, email, whiteboarding, telephony, and so on, are by now routine parts of personal and enterprise communications. The use of video conferencing is deeply integrated with modern workflows. Consequently, even minor reductions in video or audio quality can be a significant source of disruption. For example, during a video conference with numerous participants, if low audio quality results from a malfunctioning microphone, all participants may experience delays, frustration, or a poor user experience.

Low audio quality can result from a number of factors including microphone type or quality, built-in audio processing, microphone relative position, and so on. Existing systems can be reliant on verbal feedback from other participants when audio quality flounders. Even when verbal feedback is available, such feedback is subjective and provides no quantitative measure of the degree or persistence of the audio problem. Moreover, when existing systems can provide some indication of an audio quality problem, they may lack the capability to track the audio quality issue over time, across difference video conferences-a capability that may be needed to diagnose a systemic audio problem, rather than an ephemeral one.

Systems and methods for low-quality audio detection can overcome these challenges. For example, examples disclosed herein can provide a way to measure audio quality performance of a connected client device during a video conference and generate notifications, reports, etc. if issues are detected. Similarly, the techniques can be used to evaluate audio quality for a number of video conferences and provide a measure of persistent, cross-video conference audio quality.

The following non-limiting example introduces certain concepts. In the example method, a video conference provider joins a client device to a video conference, to which numerous client devices may be connected to. During the course of the video conference, the video conference provider receives, from the client device, an audio stream. For example, the client device may have a connected input device such as a microphone. A video conference participant may use the microphone to speak with the other participants. The video conference provider can receive the audio stream and relay it to the other participants, typically after various automatic audio processing is applied to the audio stream (e.g., automatic echo cancellation).

In parallel with this multiplexing role, the video conference provider determines, using a machine learning ("ML") model, an audio quality measurement based on the audio stream. For example, the ML model may be trained to output a probability that the audio stream includes low-quality audio. For instance, if the audio stream includes garbled speech with high reverberation, the ML model may be trained to output a high probability that the audio stream includes low-quality audio.

The video conference provider then computes a metric for the first audio stream based on the audio quality measurement. The metric may be, for example, a ratio that includes a measure of the period of time during the video conference during which low-quality audio has been detected divided by the total duration of the video conference. If the ML model has predicted low-quality audio for half of the total time of a particular video conference, then the value of the metric may be computed as 0.5. In some examples, an aggregate metric for the client device for a number of video conferences can be computed to track the audio quality over time and identify systemic audio quality issues.

The video conference provider then, in response to the metric satisfying a predetermined threshold, outputs a message including information about a low-quality audio status associated with the audio stream. For example, using the previous example, the predetermined threshold may be 0.3, corresponding to low-quality audio for 30% or more of a video conference. Given the computation of the metric as 0.5, corresponding to low-quality audio for 50% of the video conference, the video conference provider may output a message, such as a notification, alert, email, etc. including the information about the predicted low-quality audio. The information may include the computed metric value, possible or likely causes of the low-quality audio condition, timing information about the low-quality audio, and so on.

For instance, the message may alert system administrators via text message or chat message who can take corrective actions in cases in which the low-quality audio results from a network issue (e.g., high latency due to network congestion). In another example, the message may include suggestions for the participant user of the client device to improve the audio quality. For instance, the message may include recommendations for troubleshooting or positioning the microphone. In some examples, the video conference provider can output a command to cause a corrective action to remedy the low-quality audio status associated with the audio stream. For example, the low-quality audio stream may be correctable by changing a setting or configuration associated with automatic audio processing that can be corrected by changing or updating the setting.

In addition to the advantages described above, the systems and methods according to the present disclosure can be applied to an array of technical challenges experienced in the twin technical fields of audio processing for digital communications and low-quality audio detection. Until now, years of widespread video conferencing have left the world still plagued by garden-variety audio problems that must be troubleshot manually using subjective feedback. The innovations of the present disclosure include techniques for obtaining quantitative measures of audio quality as output by trained ML models and for determination of a metric using those measures. Video conference participants can subsequently receive actionable messages for correcting the problems and in some cases, the problems can be corrected automatically. Moreover, the audio quality can be quantified across multiple meetings to detect and similarly cause action to mitigate systemic audio quality issues.

Computing systems implementing these techniques will be improved through an overall reduction in the consumption of computational resources as less time is expended manually notifying and correcting audio quality issues. The lifetime of certain audio input and output components may be extended through fewer needless power on/off cycles that typify the haphazard manual troubleshooting required when using existing systems.

These illustrative examples are given to introduce the reader to the general subject matter discussed herein and the disclosure is not limited to these examples. The following sections describe various additional non-limiting examples of systems and methods for low-quality audio detection.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
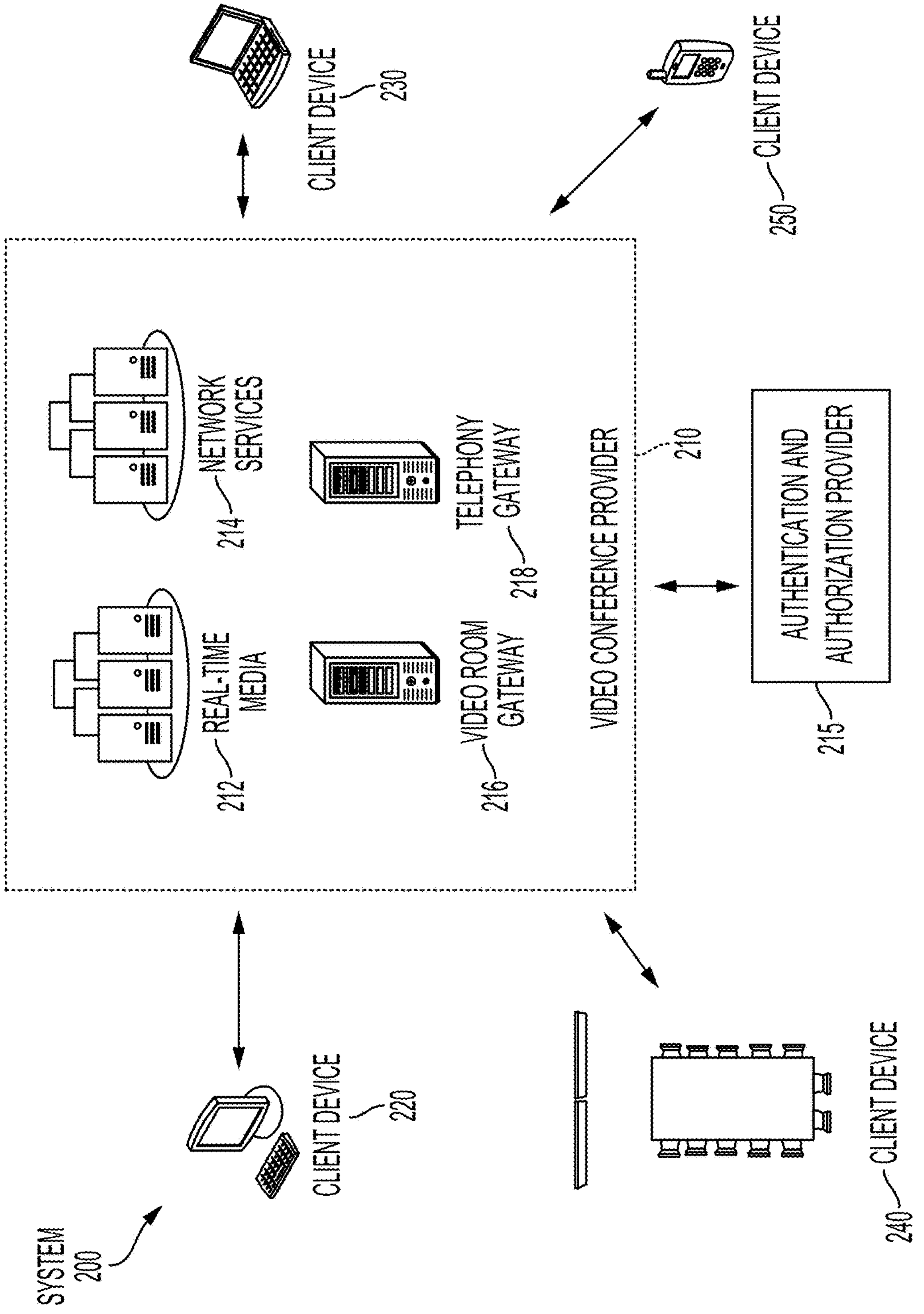
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
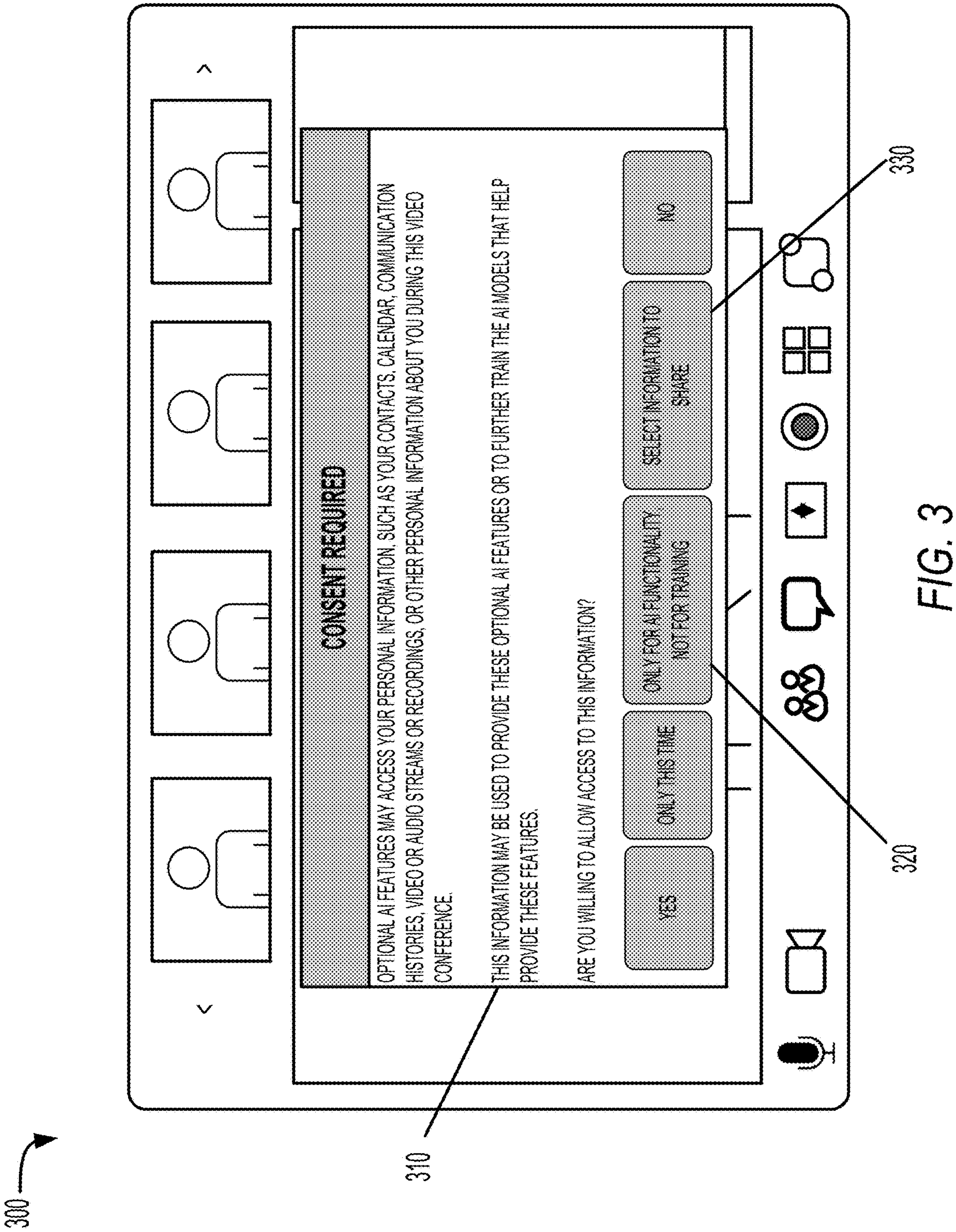
FIG. 3 shows an example user interface that may be used in some example systems configured for techniques for low-quality audio detection, according to some aspects of the present disclosure.

Turning next to FIG. 3, FIG. 3 shows an example user interface 300 that may be used in some example systems configured for low-quality audio detection. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
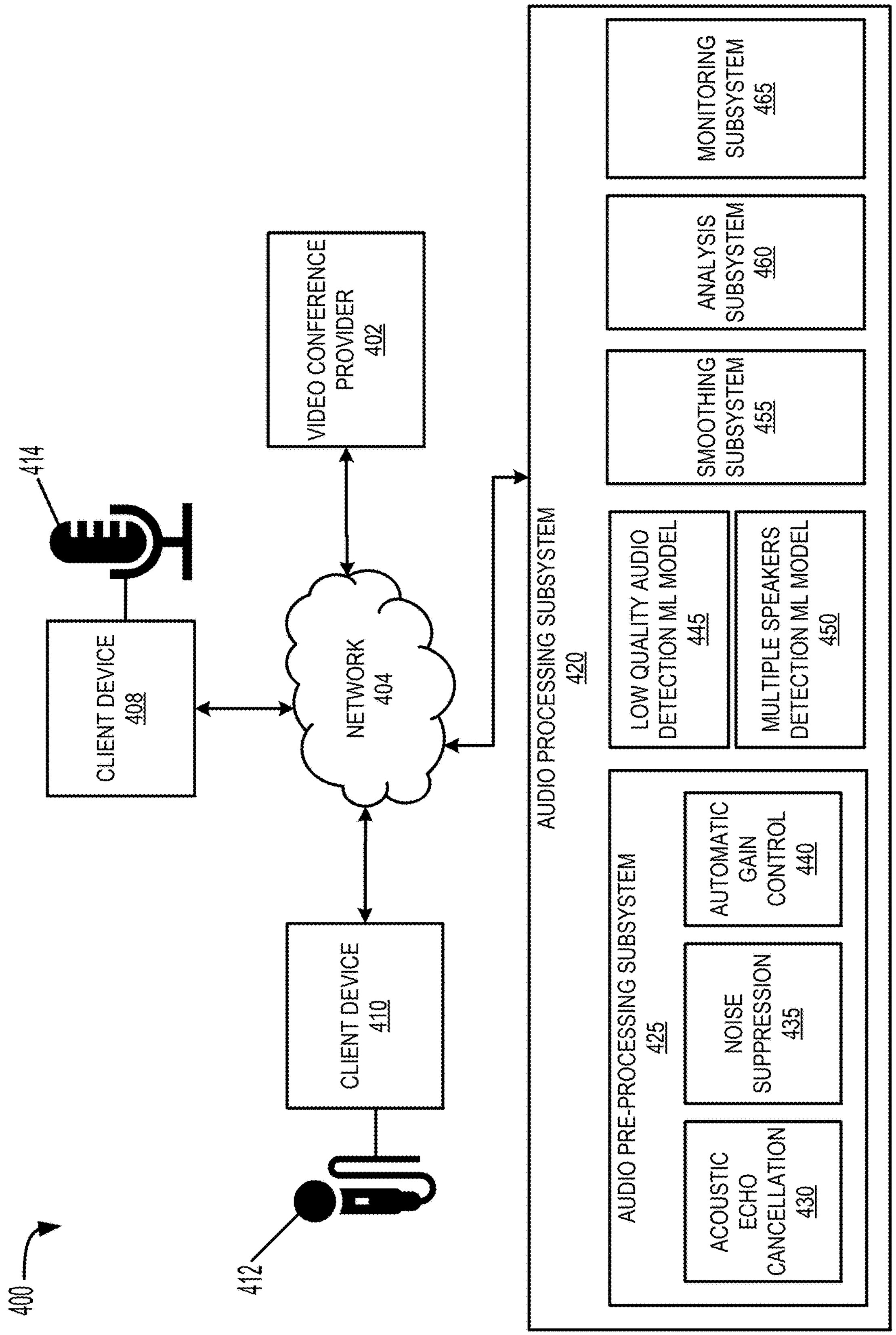
FIG. 4 shows an example of a system implementing low-quality audio detection, according to some aspects of the present disclosure.

Referring now to FIG. 4, FIG. 4 shows an example of a system 400 implementing low-quality audio detection, according to some aspects of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for low-quality audio detection. For example, the client devices 408, 410 may be laptops, desktops, smartphones, tablets, internet protocol (IP) phones, and so on.

The client devices 408, 410 may have a variety of connected audio input devices 412, 414. For example, the audio input devices 412, 414 may include embedded or internal microphones, external microphones, wireless microphones, shared microphones, and so on. The audio input devices 412, 414 may be configured to capture video conference audio as an analog or digital signal. However, analog audio input devices will require an analog-to-digital conversion (not shown) prior to processing in the audio processing subsystem 420.

In some examples, one or more of the client devices 408, 410 may be implemented as a video conference hardware suite. For example, the suite may include includes a combination of cameras, microphones, and speakers communicatively coupled with one or more computing devices. In some examples, the suite can be permanently installed in a room (e.g., a conference room) dedicated to hosting video conferences including a number of participants. For instance, the suite of video conferencing hardware can be used to enable a co-located project team to join a video conference using a single client device.

The system 400 includes an audio processing subsystem 420. The audio processing subsystem 420 is shown as a standalone component communicatively coupled over network 402, but in some examples may be a component of the video conference provider 402 or a client device 408, 410. The audio processing subsystem 420 includes a number of components for audio pre-processing, low-quality audio detection, analysis, and monitoring. The components of the audio processing subsystem 420 may be implemented in hardware, software, or a combination thereof. Software components may be hosted on physical servers, virtual machines, cloud computing instances, or a combination thereof. The components of the audio processing subsystem 420 are shown in FIG. 4 grouped together for clarity, but in various examples may include numerous separate, communicatively coupled components.

The audio processing subsystem 420 includes an audio pre-processing subsystem 425. Examples of audio pre-processing subsystem 425 can include components for performing various aspects of audio pre-processing. In the example system 400, audio pre-processing subsystem 425 includes components for acoustic echo cancellation 430, noise suppression 435, and automatic gain control. Other audio pre-processing components may include, for example, audio compression, equalization, beamforming, voice activity detection, reverberation removal, and so on. In some examples, some or all functions of the audio pre-processing subsystem may be performed by the client devices 408, 410 prior to outputting the audio stream to the audio processing subsystem.

Acoustic echo cancellation 430 can be configured to remove echo from the input audio stream. Echo may be caused by, for example, audio being played back at a remote audio output device and re-input to the sending audio input device after a perceptible delay, causing an echo effect to be played. Acoustic echo cancellation 430 can use, for example, adaptive filtering algorithms to predict and subtract the echo from the audio input. Noise suppression 435 can be configured to identify and reduce background noise while preserving the desired speech signal. Examples of techniques used for noise suppression 435 include spectral subtraction and/or using ML models identify noisy audio prior to modification of the input audio stream. Automatic gain control 440 can be used to adjust the volume of the input audio stream to maintain a consistent volume level by modifying volume variations received as part of the input audio stream. Some examples of automatic gain control 440 may use dynamic amplification or attenuation algorithms to modify the input audio stream.

Figure 9:
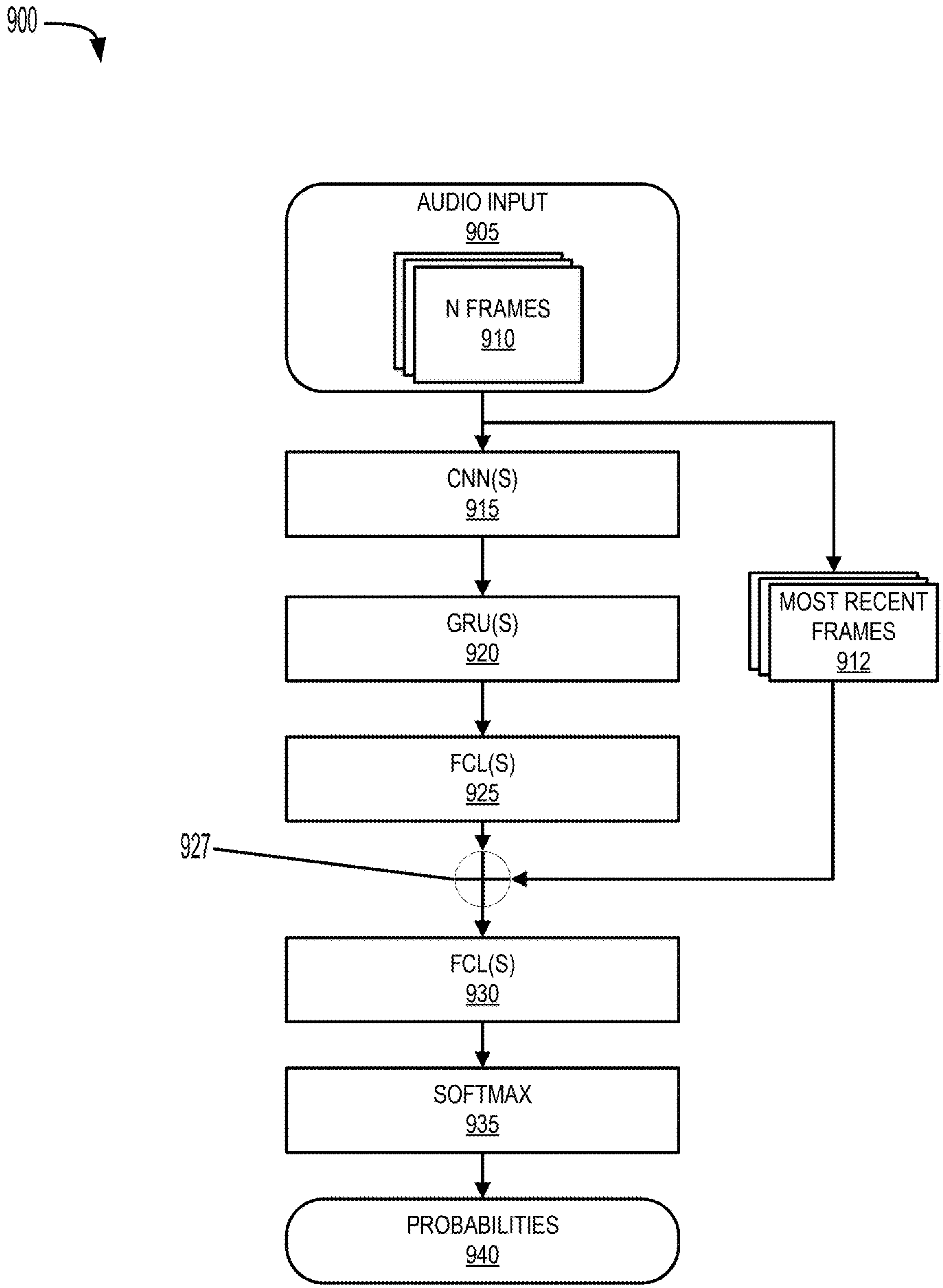
FIG. 9 shows an example implementation of an ML model used for low-quality audio detection, according to some aspects of the present disclosure.

Some examples use an ML model to determine audio quality measurements based on the input audio stream. For example, following the pre-processing by the components of audio pre-processing subsystem 425, the pre-processed input audio stream can be processed by the low-quality audio detection ML model 445. The low-quality audio detection ML model 445 can be trained to output a probability (e.g., a number from 0 to 1) that an input audio stream is free of quality problems. For example, an input audio stream with a low signal-to-noise ratio ("SNR"), from far field (e.g., the speaker is distant from the microphone), having high reverberation, or with a limited effective frequency range can result in an output probability close to 0. In contrast, a clear, high SNR, studio quality input audio stream can result in an output probability close to 1. A detailed example of one implementation of the low-quality audio detection ML model 445 is shown in FIG. 9.

In addition to the low-quality estimation made by the low-quality audio detection ML model 445, a multiple speakers detection ML model 450 can provide further input for determination of the metric for audio quality for the input audio stream. The multiple speakers detection ML model 450 can be trained to output a classification of the input audio stream. For example, the multiple speakers detection ML model 450 can be trained to classify the input audio stream into one of a number of classes such as: noise, single speaker, multiple speakers, or "babble speech" (e.g., an unknown number of speakers). The classification may be used by downstream components such as the smoothing subsystem 455 or analysis subsystem 460, as described below.

Figure 11:
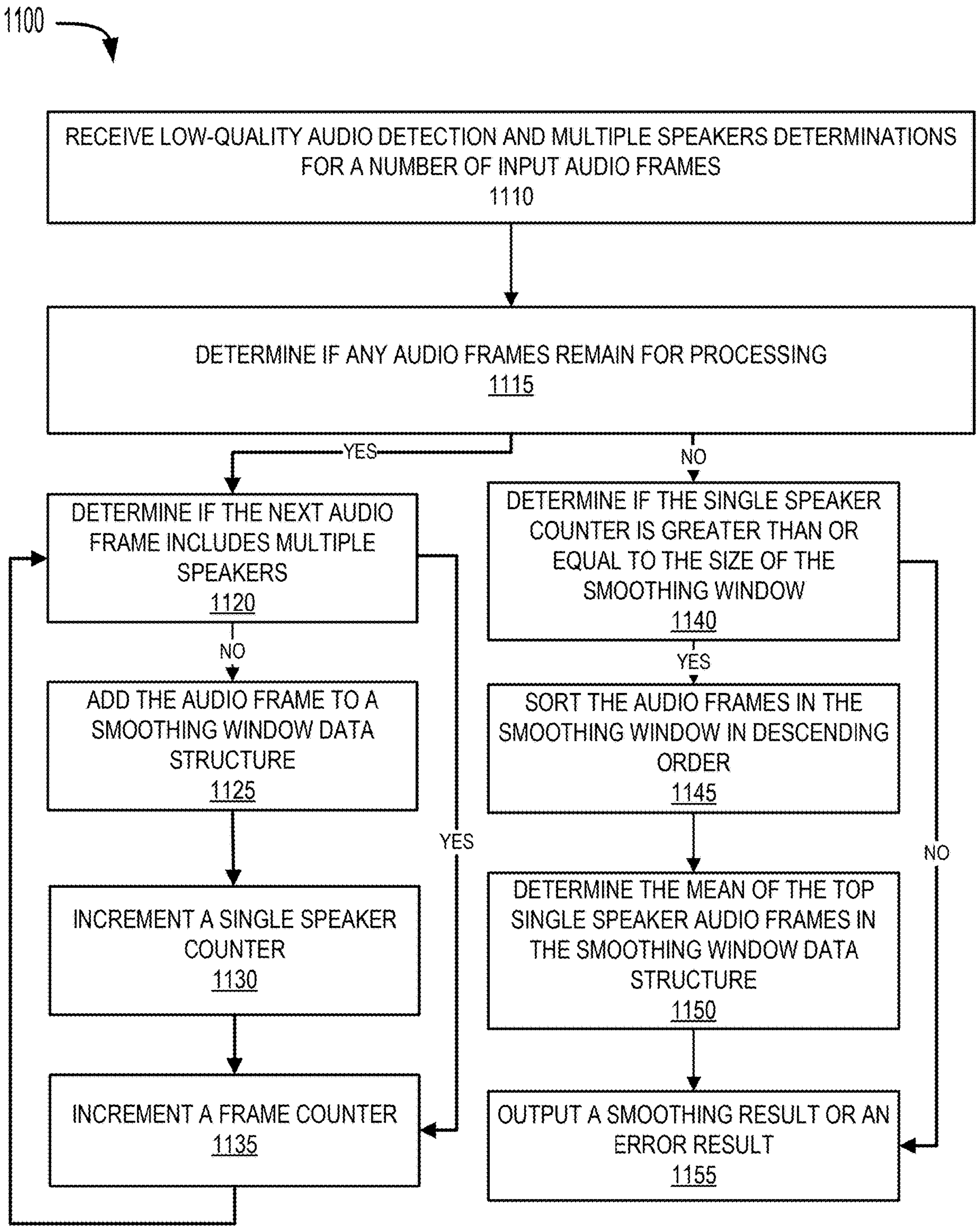
FIG. 11 shows a flowchart of an example method for smoothing computation for low-quality audio detection, according to some aspects of the present disclosure.

The audio processing subsystem 420 can compute a metric for the input audio stream based on the audio quality measurements made by the low-quality audio detection ML model 445 and/or the multiple speakers detection ML model 450. To ensure that the metric reflects overall audio quality and is not artificially reduced by momentary or incidental changes in audio quality (e.g., a dog barking or a brief microphone disconnect) the smoothing subsystem 455 can receive the outputs of the low-quality audio detection ML model 445 and/or the multiple speakers detection ML model 450 and output a smoothed audio quality measurement. An example implementation of an algorithm used some examples of smoothing subsystem 455 is shown in FIG. 11.

Figure 12:
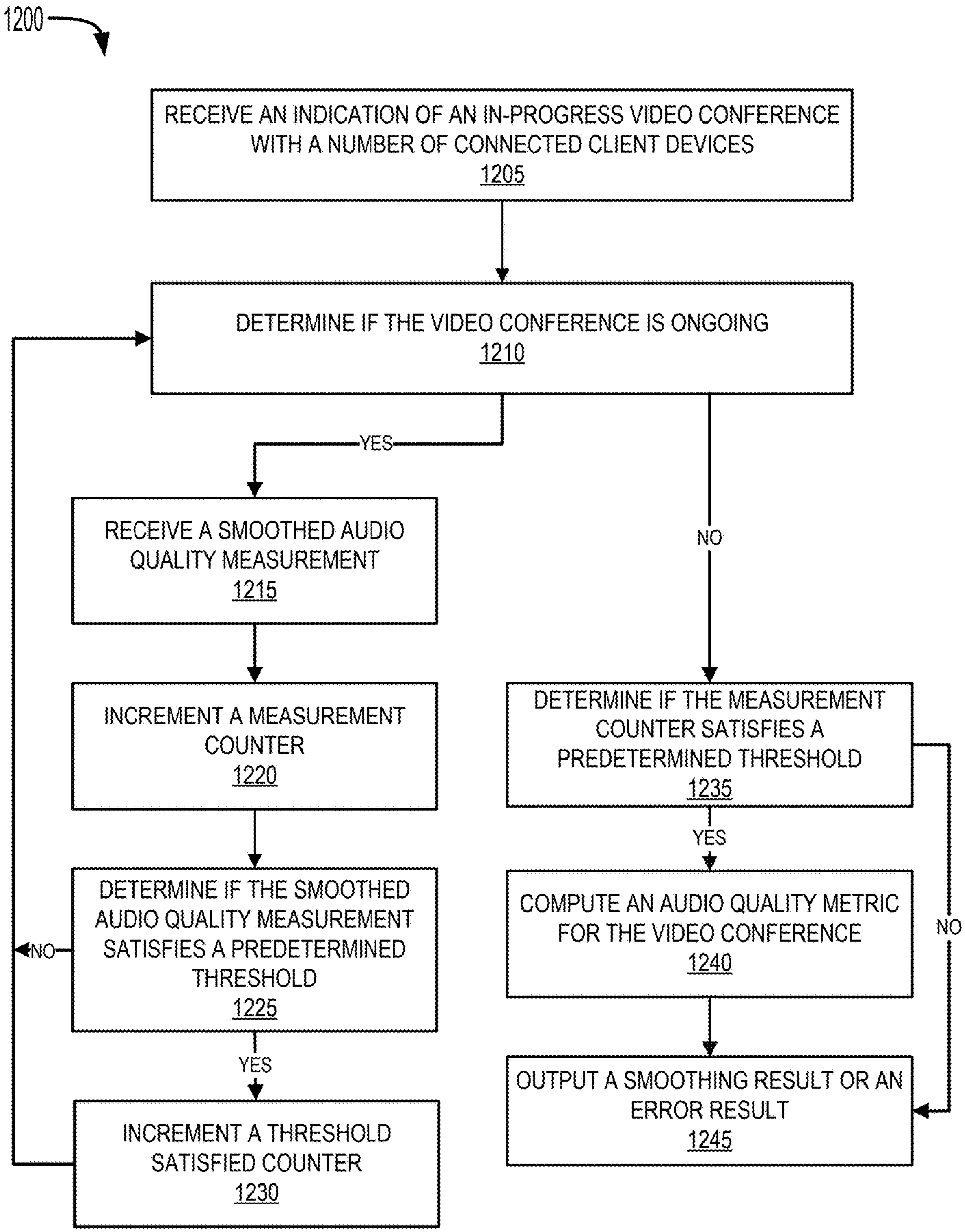
FIG. 12 shows a flowchart of an example method for metric computation for low-quality audio detection, according to some aspects of the present disclosure.

The analysis subsystem 460 can then compute the metric given the smoothed audio quality measurement. For example, the analysis subsystem 460 can compute a low-quality audio duration ratio, or the ratio of the time for which the smoothed audio quality measurement corresponded to low audio quality to the total duration of the video conference. An example implementation of this metric computation is shown in FIG. 12. The analysis subsystem 460 can compute other low-quality audio metrics such as aggregate, cross-meeting metrics that measure the audio quality of a particular system or hardware configuration over a period of time.

In response to the first metric satisfying a predetermined threshold, the audio processing subsystem 420 includes a monitoring subsystem 465 for outputting a message including information about any determined low-quality audio status metrics associated with the input audio stream. For example, if a computed metric for a concluded video conference is 0.5, corresponding to low-quality audio for half of the video conference, then this may satisfy a predetermined threshold of 0.3. In that case, the monitoring subsystem 465 can be configured to output commands to cause corrective action to remedy the low-quality audio status.

For instance, the corrective action may be a disabling of a component (e.g., the noise suppression component 435). Other examples of corrective actions include muting, adjustments to automatic gain control or acoustic echo cancellation, microphone switching, reallocation of bandwidth among video conference provider 402 server resources, or audio codec changes.

The video conference provider 402 may output commands to the client devices 410 to cause a corrective action. However, execution of the commands may require explicit authorization or pre-authorization by the user of the client device 410. In some examples, organizational administrators can provide pre-authorization for certain corrective actions under some circumstances. For instance, organizational administrators may provide pre-authorization for muting or microphone switching for client devices 408, 410 when low quality audio issues detected. In some examples, the pre-authorization may be scoped to certain video conferences (e.g., large meetings, high-importance meetings, etc.).

In another example, the monitoring subsystem 465 can generate notifications including recommendations to remedy the low-quality audio status. For instance, the notification may include a list of common troubleshooting steps. Notifications may be generated and output over one or more channels including email, chat, text messaging, push notifications, desktop alerts, and so on.

For the determination of corrective actions and recommendations, the monitoring subsystem 465 can receive inputs from various hardware and software components. For instance, the client devices 408, 410 can send telemetry about connected audio input devices 412, 414. The audio pre-processing subsystem 425 can include components that can identify likely causes of low-quality audio. Likewise, in addition to the audio quality measurements discussed above, the low-quality audio detection ML model 445 can be trained to predict likely causes of low-quality audio based on learned characteristics of the audio streams used for training.

Figure 5:
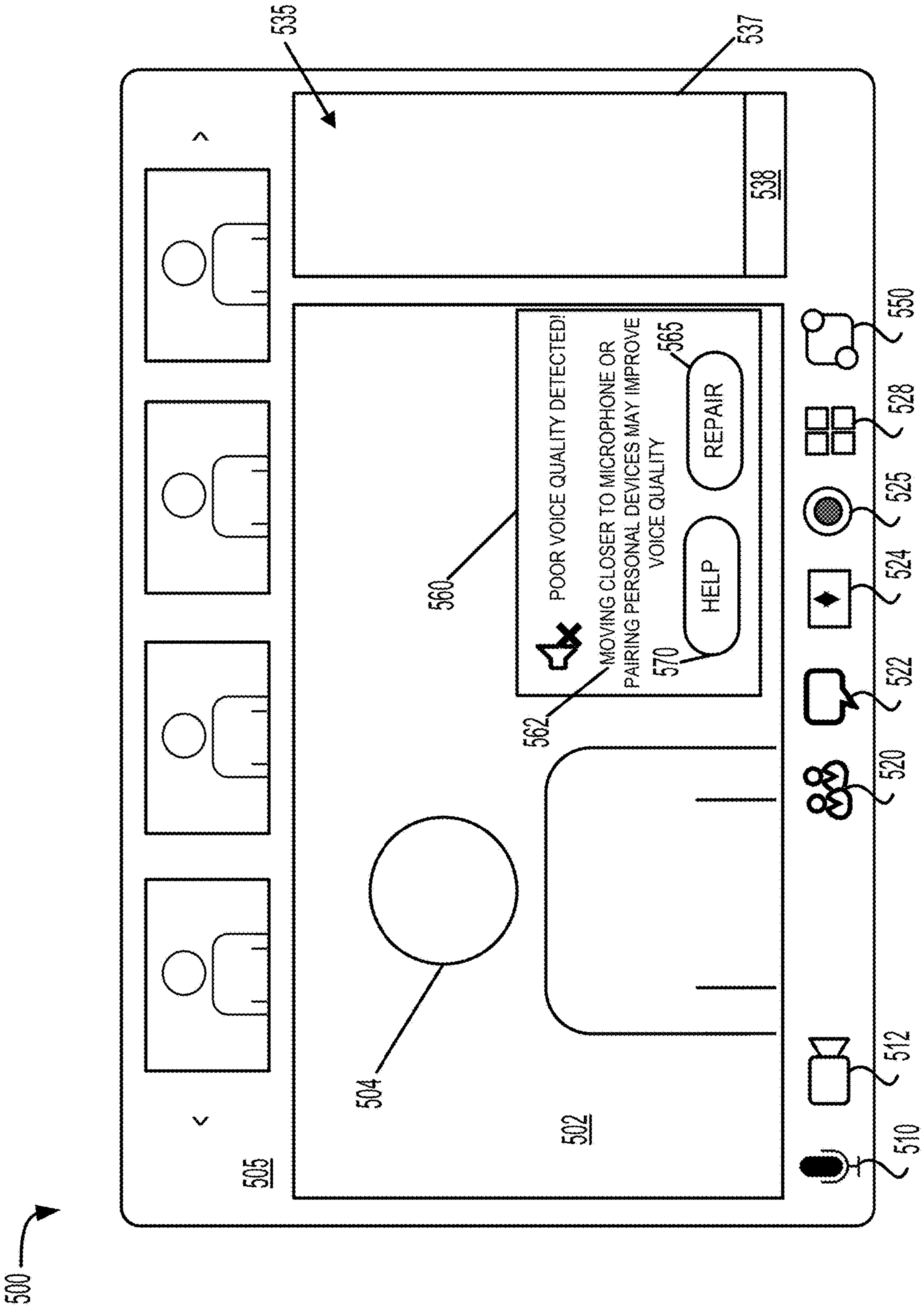
FIG. 5 shows an example of a UI for low-quality audio detection, according to some aspects of the present disclosure.

Turning next to FIG. 5, FIG. 5 shows an example of a UI 500 for low-quality audio detection, according to some aspects of the present disclosure. FIG. 5 depicts an example of a UI 500 that may be shown on a display device of a client device 408 during video conferencing or chat messaging, although the techniques of this disclosure may be implemented in a variety of client UI contexts. In particular, UI 500 depicts an example of a notification that may be output in response to a detection of a low-quality audio status. For example, the monitoring subsystem 465 of system 400 of FIG. 4, upon determining that a computed metric satisfies a predetermined threshold, can output a command to the client device with the associated low-quality audio status to cause display of the notification 560 described below.

UI 500 shows an in-progress video conference as may be provided by suitable video conference client software. UI 500 includes a main speaker window 502. In some examples, the UI 500 is configured to display the video conference participant 504 that is currently speaking (e.g., "speaker view") on the main speaker window 502, but other configurations are possible. For instance, some examples include a UI control for "pinning" a particular participant who can be shown in main speaker window 502 regardless of who is speaking.

The UI 500 includes a number of video conference participants 505. In the UI 500 configuration depicted, the participants 505 are shown at the top of the UI 500. Depending on the configuration, in various examples, the participants 505 may be arrayed in a grid-like fashion, may not be shown at all, or may be displayed in some other manner. In this example, the participants 505 are shown above the main speaker window 502 as smaller participant windows, which allow the participant to view some of the other participants in the video conference, as well as controls ("<" and ">") to let the host scroll to view other participants in the video conference.

The UI 500 includes a number of controls for configuring the video conference or interacting with the participants 505. For example, the UI 500 includes controls 510 and 512 allow a participant to toggle on or off audio or video streams captured by a microphone or camera connected to the client device 410. Control 520 allows the participant to view any other participants present in the video conference along with the participant. Control 522 allows the participant to execute an application or client software function to send text or chat messages to other participants, whether to specific participants or to the entire meeting. Control 524 allows the participant to share content from their client device. Control 525 allows the participant toggle recording of the meeting, and control 528 allows the participant to select an option to join a breakout room. Control 550 allows the participant to launch an app within the video conference client software, to, for example, access content to share with other participants in the video conference.

The control 522, when selected, can launch a chat application 535. The chat application includes a main chat window 537 that shows a chat history among the participants or a subset thereof. The chat application also includes a chat input control 538 that can be used to input chat messages, share images or video, choose emojis, start threads, and so on.

UI 500 shows an example notification 560 implemented as a dialog box UI control. The notification 560 shows an indication that a low-quality audio status has been detected (e.g., a computed metric has satisfied a predetermined threshold). The notification 560 includes a recommendation message 562 that can include suggestions or recommendations for mitigating or correcting the low-quality audio status. The message 562 may be generated by the monitoring subsystem 465 or other suitable component. For example, the message 562 may include text that reminds participants to move closer to the microphone or to pair their personal devices to improve audio or voice quality.

The notification 560 includes a repair UI control 565. The repair UI control 565 may be used to execute commands to correct the low-quality audio status. For instance, the low-quality audio status may be caused by a misconfiguration of an audio input device or due to a pre-processing step. The video conference provider 402 or client device 408, 410 may include a component, such as the monitoring subsystem 465, that can determine commands that may correct the low-quality audio status. Selection of the repair UI control 565 can be used to provide authorization to execute commands for the corrective actions determined by the video conference provider 402.

The notification 560 also includes a help UI control 570. The help UI control 570 can be used to display recommendations, documentation, frequently asked questions ("FAQs"), and so on, that may be used by the user of the client device to correct the low-quality audio status. The video conference provider 402 may include a component, such as the monitoring subsystem 465, that can determine the recommendations for correction of the low-quality audio status.

Other examples of the notification 560 may differ based on the capabilities of the displaying client device 408, 410. In some examples, such as when the client device 408, 410 is a video conference hardware suite, the notification 560 shown during a video conference may include the message 562 but lack the controls 565, 570 if there is no connected input device.

Figure 6:
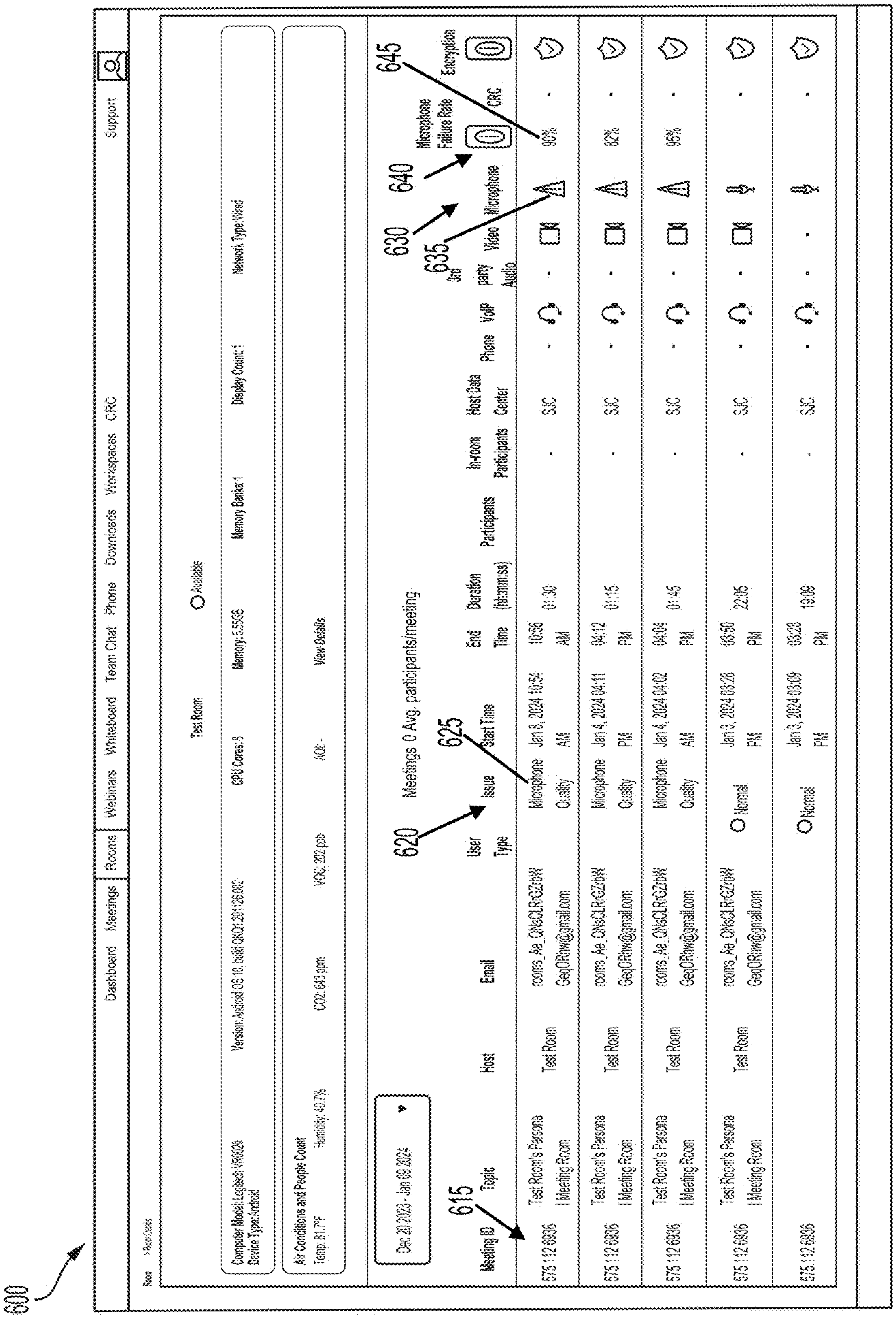
FIG. 6 shows another example of a UI for low-quality audio detection, according to some aspects of the present disclosure.

Turning next to FIG. 6, FIG. 6 shows another example of a UI 600 for low-quality audio detection, according to some aspects of the present disclosure. In particular, UI 600 shows an example of a dashboard including historical information about a video conference hardware suite used for hosting video conferences. The video conference hardware suite may include a combination of cameras, microphones, and speakers communicatively coupled with one or more computing devices. In some examples, the suite can be permanently installed in a room (e.g., a conference room) dedicated to hosting video conferences including a number of participants.

In this example, the video conference hardware suite 605 is shown along with a current configuration 610. The current configuration 610 can include near real-time information about the computing hardware and environmental conditions in the vicinity of the video conference hardware suite (e.g., in the containing room) based on installed sensors.

The UI 600 includes a number of rows corresponding to recent or in-progress meetings 615 hosted using the video conference hardware suite. The rows may include information for administration and organization of video conferences using the video conference hardware suite such as meeting identifiers, meeting topics, meeting organizer and email, meeting start and stop time, meeting duration, and other information.

UI 600 includes a column for a problem status indicator 620. The problem status indicator 620 can provide an indication when a problem with the hardware or software of the video conference hardware suite, such as low-quality audio, is detected during or after a video conference. In cases where no such problem is detected, the problem status indicator 620 can show an indication such as the word "Normal" or other suitable UI indication. In examples in which a problem, such as low-quality audio, is detected, the problem status indicator 620 can show a low-quality audio quality indication 625 such as the phrase "Microphone quality" or other suitable UI indication.

The low-quality audio quality indication 625 may be shown when a computed audio quality metric for particular video conference satisfies a predefined threshold. More detail may be shown pertaining to low-quality audio determinations. For example, the example UI 600 includes a column for a microphone status indicator 630 and an audio quality metric indicator 640. For video conferences for which the low-quality audio quality indication 625 is displayed, the microphone status indicator column 630 may show a microphone problem icon 635. A computed audio quality metric 645 for each video conference may be displayed in the audio quality metric indicator column 640. In some examples, the audio quality metric 645 may only be displayed when the measured audio quality has satisfied the predetermined threshold.

Figure 7:
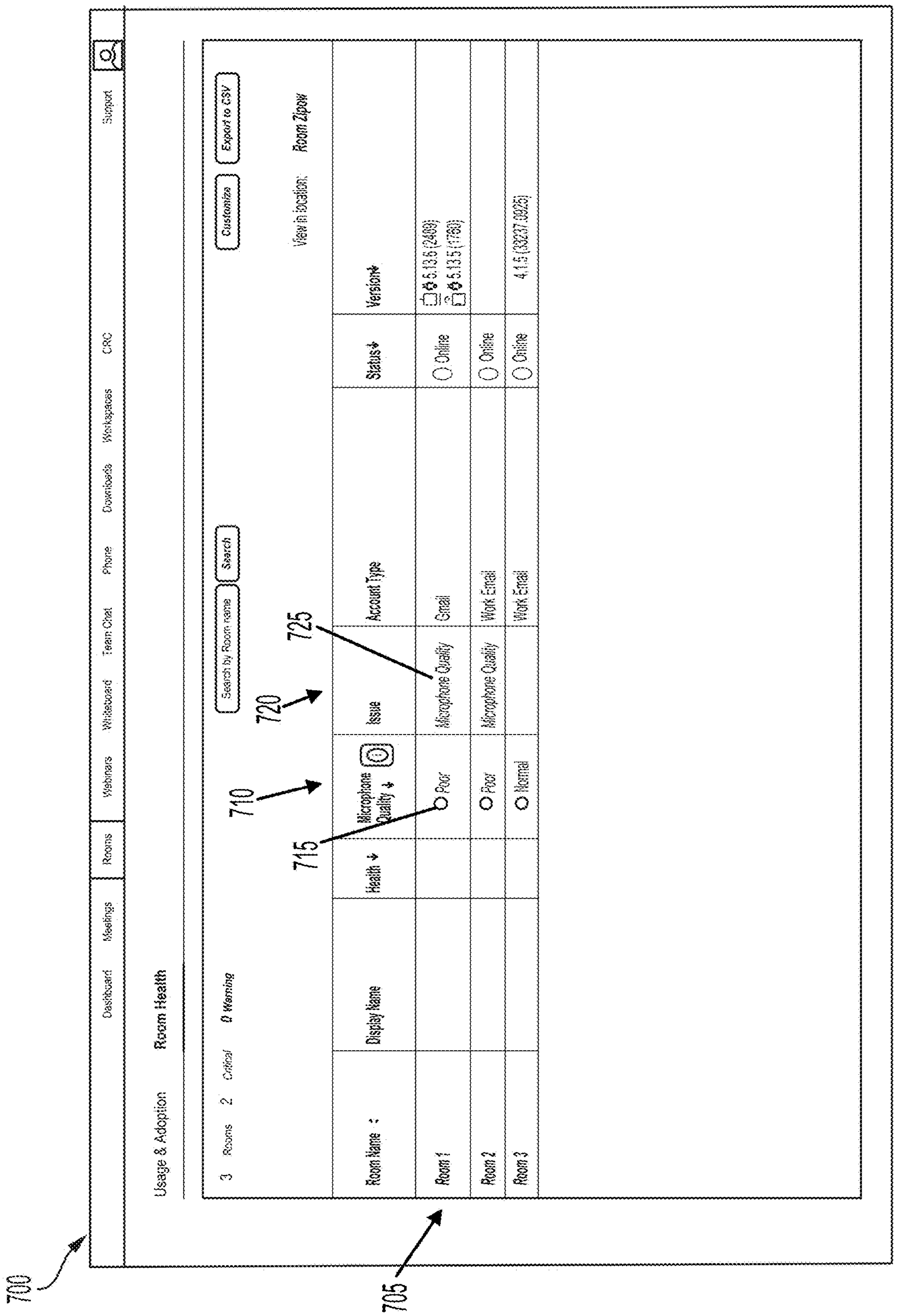
FIG. 7 shows another example of a UI for low-quality audio detection, according to some aspects of the present disclosure.

Turning next to FIG. 7, FIG. 7 shows another example of a UI 700 for low-quality audio detection, according to some aspects of the present disclosure. In particular, UI 700 shows an example of a dashboard showing status information, including audio quality information, about numerous video conference hardware suites used for hosting video conferences.

In this example, a number of video conference hardware suites 705 are shown in a series of rows. The video conference hardware suites rows 705 can include information such as display names for each video conference hardware suite (e.g., the name which may be shown for the corresponding detailed view in FIG. 6), suite health, audio quality 710, audio issue 720, account type, suite status, version information, and so on. In some examples, a video conference hardware suite label or row can act as a UI control to cause a detailed view for a particular video conference hardware suite such as the example of UI 600 in the previous figure.

Audio quality column 710 includes an audio quality indication 715 for each associated video conference hardware suite along with an audio issue indication 725 for some examples. For instance, in the example shown, the audio quality indication 715 is "Poor" and thus a corresponding audio issue indication 725 is shown. In this example, the audio issue indication 725 is "Microphone quality."

In some examples, the audio quality indication 715 may be one of a predetermined set of values such as "Normal," "Poor," and "Fair," and so on. Likewise, the audio issue indication 725 can be one of a predetermined set of values such as "Microphone quality," "Echo," "Reverberation," "Network," "Network latency," and so on.

The selection of a value for the audio quality indication 715 can correspond to numerical values of audio quality as computed by the analysis subsystem 460 of FIG. 4. For example, the audio quality metric may be computed for individual video conferences and then an aggregate "cross-meeting" audio quality metric can be computed for a number of meetings. The aggregate audio quality metric can be used to select the audio quality indication 715 according to predetermined ranges. For instance, an aggregate audio quality metric of 0%-70% low-quality audio may correspond to "Normal" while an aggregate audio quality metric of 70%-100% low-quality audio may correspond to "Poor."

The audio issue indication 725 can be determined by, for example, the monitoring subsystem 465. The monitoring subsystem 465 can receive hardware or software inputs that can be used to determine or infer a likely cause of a low-quality audio status. In some examples, the audio issue indication 725 can function as a UI control that can be selected to receive detailed information about the determined or inferred cause along with recommendations for corrective actions.

Figure 8:
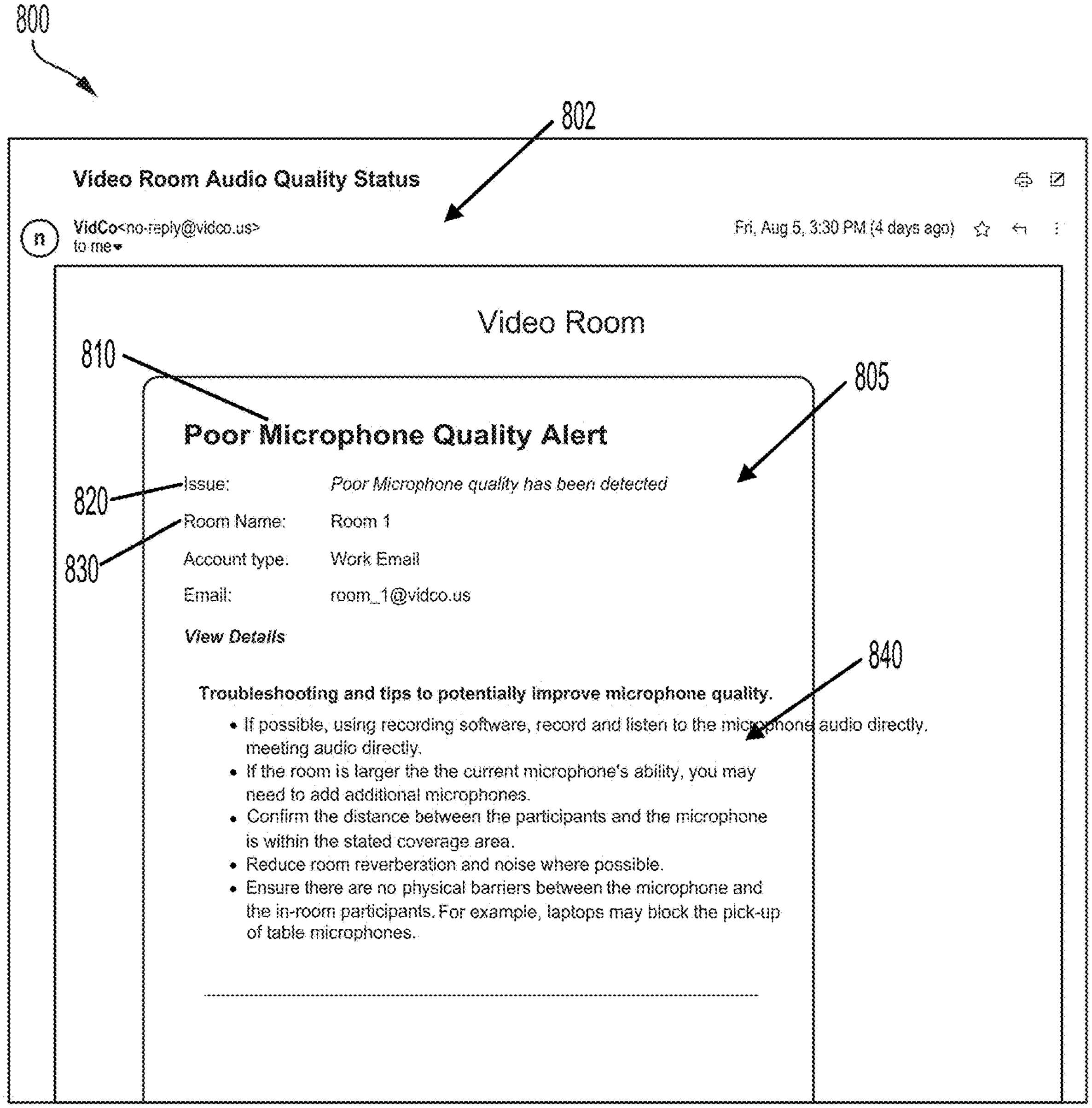
FIG. 8 shows another example of a notification email for low-quality audio detection, according to some aspects of the present disclosure.

Turning next to FIG. 8, FIG. 8 shows another example of a notification email 800 for low-quality audio detection, according to some aspects of the present disclosure. The email 800 is an example of a notification that includes information about a determined low-quality audio status, but various channels for notification can be used. For example, mobile device push notifications, desktop alerts, pager alerts, text messages, and the like can be used to convey the information about a determined low-quality audio status to users or administrators.

Email 800 includes headers 802, including information about the subject, email sender, destinations(s), and so on. The email body 805 includes the information about the determined low-quality audio status. For example, the email body 805 includes a notification title 810 describing the magnitude low-quality audio status determined. In this example, the status is described as "Poor." The issue description 820 can include a brief description of the audio quality issue, in cases in which likely causes have been determined or inferred. In this example the issue is described generically as a "microphone issue." The issue description 820 can be one of a predetermined set of values such as "microphone issue," echo detected," "network issue," "network latency low," and so on. The email 800 includes a location identifier 830. For instance, the location identifier 830 may specify a particular video conference hardware suite.

The email 800 includes a recommendation list 840. For example, the recommendation list 840 can be generated by the monitoring subsystem 465 in response to determination or inference of a cause of a low-quality audio status. In some examples, the recommendation list 840 can include predetermined steps for particular categories of audio quality issues. In some examples, when sufficient data is available, the recommendation list 840 can include specific recommendations tailored to particular hardware. For instance, if the client device 410 outputs telemetry about connected audio input devices, the monitoring subsystem 465 can, in some cases, detect connectivity issues or audio quality issues based the telemetry.

Turning next to FIG. 9, FIG. 9 shows an example implementation of an ML model 900 used for low-quality audio detection, according to some aspects of the present disclosure. For example, ML model 900 may be an example implementation of the low-quality audio detection ML model 445. The ML model 900, or a similar implementation, may also be used to implement the multiple speakers detection ML model 450.

ML model 900 receives audio input 905 that includes a number of audio frames 910. The audio frames 910 may be, for example, representations of portions of the input audio stream. For instance, the input audio stream maybe received by the audio processing subsystem 420 as a series of TCP/IP packets, each packet including an audio frame that is a portion of the audio stream. Prior to input to the ML model 900, the audio frames 910 may be converted into a format amenable to processing by the components of the ML model 900. For example, the audio frames 910 may be formatted as spectrograms, Mel spectrograms, Mel-frequency cepstral coefficients ("MFCCs"), and so on.

In some examples, the ML model 900 receives audio frames 910 in batches. For example, one batch of audio frames 910 may include 100 10 millisecond audio frames, but other batch sizes or audio frame sizes may be used according to the factors such as computational efficiency, language, sampling rate, and so on. A subset of the audio frames 910 that includes a number of "most recent" audio frames 912 can be identified to improve sensitivity to the initiation of speech during the batch of audio frames 910. For example, the most recent audio frames 912 may include the 2 most recent audio frames.

The audio frames 910 can be received by one or more convolutional neural networks ("CNNs") 915. The CNNs 915 can be trained to apply convolutional layers to extract features from the audio data. The layers of the CNNs 915 can perform operations such as convolution, application of an activation function (e.g., Rectified Linear Unit ("ReLU")), or normalization that can "extract" temporal or spectral patterns in the audio frames 910. The extracted features can be output as embedded representations (e.g., high-dimensional vectors).

The extracted features output by CNNs 915 can be received by gated recurrent units ("GRUs") 920. The GRUs 920 may include gating mechanisms that can perform operations such as keeping, updating, or discarding input audio frames 910 to mitigate issues such as vanishing gradients. Use of GRUs 920 can sustain processing of related inputs for longer durations and thus provide for representation of long-term dependencies in the input data. In some examples, the GRUs 920 output a collection of states that can be input to the fully connected layers ("FCLs") 925.

The FCLs 925 may be a neural network in which each neuron is connected to all previous and subsequent neurons. The FCLs 925 can be trained to integrate and process the features extracted by the CNNs 915 and GRUs 920. The FCLs may be trained to output the final extracted features into a suitable format for combination 927 with recent audio frames 912. The combination 927 can be used to add attention to the most recent audio frames to shorten the detection delay of the onset of the voice or speaking.

The combination 927 is received by a second FCLs 930 component. The FCLs 930 can be trained to further integrate and process the combination 927. The output of the FCLs 930 is received by a SoftMax component 935. The SoftMax component 935 can convert the output of the FCLs 930 into probabilities 940 such as probability distribution or a scalar probability prediction. The SoftMax component 935 may include, for example, an implementation of the SoftMax function, which normalizes the output values into probabilities 940 that sum to one. The SoftMax component 935 may output probabilities 940 at a predetermined inference rate, such as once every 250 milliseconds.

The ML model 900, or the components described above, can be trained using supervised or unsupervised training methods. In some examples, the ML model 900 can be trained using publicly available and/or commercially licensed speech training data such as the TIMIT Acoustic-Phonetic Continuous Speech Corpus provided by the Massachusetts Institute of Technology ("MIT"), SRI International, and Texas Instruments, Inc. ("TI") or the TED-LIUM corpus provided by the Laboratoire d'Informatique de l'Université du Mans in France.

Alternatively, training data can be obtained by recording voice data, given explicit consent of the participants. For example, video conference hardware suites can be configured to obtain recordings of voice data from video conferences. For data obtained from local recordings such as these, additional enhancements can be applied to the voice data to improve the ability of the ML model to generate accurate probabilities 940. For example, enhancements such as equalizations, filters (e.g., highpass, lowpass, bandstop, etc.), room simulations, mix, or denoising, can be applied.

In some examples, to train the ML model 900, the training data can be split into two classes, such as high-quality and low-quality data. The data thus-labeled can then be used for supervised training of the ML model. For instance, a number of frames of labeled training data can be provided to the ML model. Based on the correctness of the output probabilities 940, the parameters of the various components of the ML model 900 can be updated in a feedback loop to train the ML model.

Although the example ML model 900 included certain components, other examples may include other ML components in addition to or in lieu of the examples given here. For example, other ML model components may include recurrent neural networks ("RNNs"), long short-term memory ("LSTM") networks, attention mechanisms, transformers, autoencoders ("AEs"), variational AEs ("VAEs"), generative adversarial networks ("GANs"), normalization layers (e.g., batch normalization, layer normalization), or pooling layers, among many others.

Figure 10:
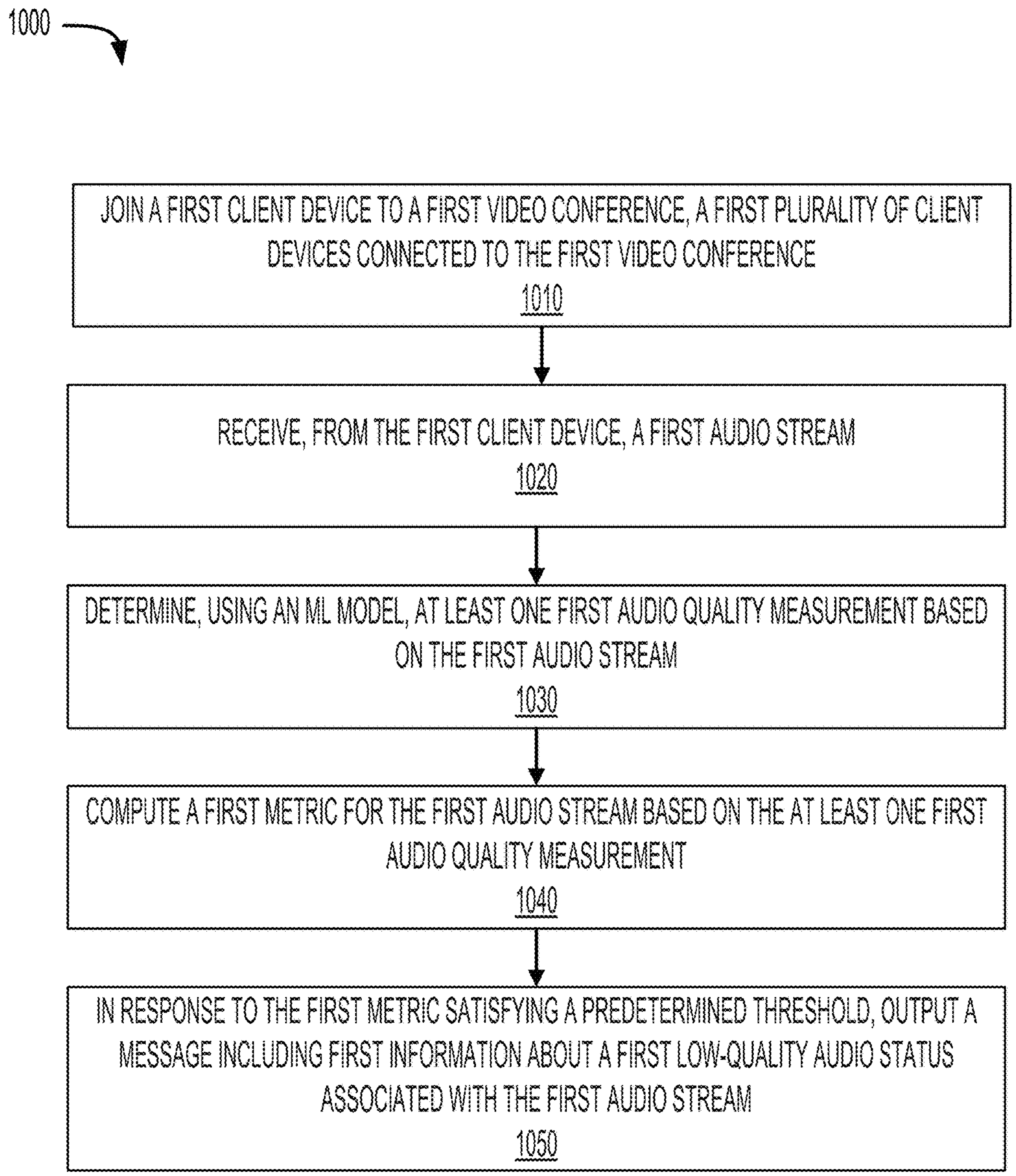
FIG. 10 shows a flowchart of an example method for low-quality audio detection, according to some aspects of the present disclosure.

Referring now to FIG. 10, FIG. 10 shows a flowchart of an example method 1000 for low-quality audio detection, according to some aspects of the present disclosure. The description of the method 1000 in FIG. 10 will be made with reference to FIGS. 4-9, however any suitable system according to this disclosure may be used, such as the example systems 100 and 200, shown in FIGS. 1 and 2. It should be appreciated that method 1000 provides a particular method for low-quality audio detection. Other sequences of operations may also be performed according to alternative examples. For example, alternative examples of the present disclosure may perform the steps outlined above in a different order. Moreover, the individual operations illustrated by method 1000 may include multiple sub-operations that may be performed in various sequences as appropriate to the individual operation. Furthermore, additional operations may be added or removed depending on the particular applications. Further, the operations described in method 1000 may be performed by different devices. For example, the description is given from the perspective of the audio processing subsystem 420 but other configurations are possible. For instance, these operations or a portion thereof may be performed by a client device 408, 410. One of ordinary skill in the art would recognize many variations, modifications, and alternatives.

The method 1000 may include block 1010. At block 1010, a computing system such as the audio processing subsystem 420 or client device 408, 410 joins (or is joined) a first client device to a first video conference, to which a number of client devices are connected. For example, the first client device can output an indication to the video conference provider 402 including a specification of a video conference to join. The video conference provider 402 can join the first client device to the specified video conference if it is ongoing or instantiate a new video conference, according to the specification. The video conference provider 402 can similarly join the other client devices to the video conference and provide multiplexed receiving and distributing of the various audio and video streams generated by the connected client devices.

At block 1020, the computing system receives, from the first client device, a first audio stream. For example, during the video conference, the first client device can receive audio input to an audio input device, such as a participant speaking. In some examples, the first audio stream may be pre-processed for noise suppression, acoustic echo cancellation, automatic gain control, or other audio quality improvement techniques. The pre-processing may be performed by subsystems of the client devices 408, 410 or by video conference provider 402 or other component such as the audio processing subsystem of FIG. 4. In some examples, the pre-processing functions may be divided between the client devices 408, 410 and the downstream server components such as the video conference provider 402.

At block 1030, the computing system determines, using a ML model (e.g., the ML model 900 of FIG. 9), at least one first audio quality measurement based on the first audio stream. For example, an ML model can be trained to classify audio quality by outputting a probability that the received first audio stream is of high quality. Other classification schemes may be used. For instance, the ML model can be trained to characterize the first audio stream according to a predefined number of quality levels. In some examples, the ML model can be trained to characterize the first audio stream with even greater granularity. For instance, the ML model can be trained to identify characteristics such as graininess, noisiness, clarity, distortion, or the presence of echoes. In some examples, the ML model can include an ensemble of ML models working in concert. For instance, the ML model can include a low-quality audio detection ML model 445 and/or the multiple speakers detection ML model 450 shown in FIG. 4.

At block 1040, the computing system computes a first metric for the first audio stream based on the at least one first audio quality measurement. For example, the analysis subsystem 460 shown in FIG. 4 can receive inputs including the pre-processed audio stream and the outputs of the ML model to compute a metric. For a particular video conference, the metric may be a low-quality audio duration ratio that is the fraction of the video conference during which low-quality audio was detected (e.g., if 40 minutes of a 100 minute video conference experienced low-quality audio, the ratio may be computed as 0.4). A detailed example implementation of an algorithm that can be used for metric computation by the analysis subsystem 460 is shown in FIG. 12.

In some examples, the audio quality measurements output by the ML model may be "smoothed" before computation of the metric. The smoothed audio quality measurements can be used to prevent, for instance, momentary network or computing errors from affecting the metric. For example, the smoothing subsystem 455 can require a predetermined number of measurements of a specified quality before outputting a measurement to the analysis subsystem. A detailed example implementation of an algorithm that can be used in smoothing subsystem 455 is shown in FIG. 11.

In some examples, the computing system can compute aggregate metrics for multiple video conferences. For example, following the first video conference, the first metric can be persisted using a suitable storage system. Later, the first client device can join a second video conference, causing blocks 1010-1040 to recur for the second video conference, resulting in second metric based on a sound quality measurement for the second video conference. The analysis subsystem 460 can then compute a third metric for the first client device based on the first metric and the second metric. For example, the third metric may be an aggregate metric that is an average of the metrics computed for a number of video conferences. In another example, the third or aggregate metric may be a ratio of a number of computed aggregate metrics that have satisfied a predetermined threshold to the total number of aggregate metrics computed.

At block 1050, in response to the first metric satisfying a predetermined threshold, the computing system outputs a message including first information about a first low-quality audio status associated with the first audio stream. A message can likewise be output in response to the aggregate metric satisfying another predetermined threshold.

A component of the computing system such as the monitoring subsystem 465 of FIG. 4 can output the message. For example, the message may include commands to cause corrective actions to remedy the low-quality audio status. For instance, if the low-quality audio is due to an audio misconfiguration or a pre-processing step, the commands can, in some cases, correct the misconfiguration. In this example, explicit consent of the user of the first client device may be required prior to execution of instructions on the first client device. The message can, for example, cause a dialog box to appear on a suitable GUI including the information about the first low-quality audio status and the proposed corrective actions. An example of a message shown as a notification a client device UI is shown in FIG. 5. Examples of dashboards including information about low-quality audio status results are shown in FIGS. 6 and 7.

In some examples, the message may include one or more recommendations to remedy the first low-quality audio status. For example, the recommendations may include troubleshooting steps, common causes of audio issues, links to documentation, diagnostic procedures, and so on. An example of a message including recommendations is shown in FIG. 8 above.

Referring now to FIG. 11, FIG. 11 shows a flowchart of an example method 1100 for smoothing computation for low-quality audio detection, according to some aspects of the present disclosure. The description of the method 1100 in FIG. 11 will be made with reference to FIGS. 4-9, however any suitable system according to this disclosure may be used, such as the example systems 100 and 200, shown in FIGS. 1 and 2. It should be appreciated that method 1100 provides a particular method for low-quality audio detection. Other sequences of operations may also be performed according to alternative examples. For example, alternative examples of the present disclosure may perform the steps outlined above in a different order. Moreover, the individual operations illustrated by method 1100 may include multiple sub-operations that may be performed in various sequences as appropriate to the individual operation. Furthermore, additional operations may be added or removed depending on the particular applications. Further, the operations described in method 1100 may be performed by different devices. For example, the description is given from the perspective of the audio processing subsystem 420, and the smoothing subsystem 455 in particular, but other configurations are possible. For instance, these operations or a portion thereof may be performed by a client device 408, 410. One of ordinary skill in the art would recognize many variations, modifications, and alternatives.

Method 1100 depicts an example implementation of some aspects of the smoothing subsystem 455 shown in FIG. 4. At block 1110, a computing system receives low-quality audio detection and multiple speakers determinations for a number of input audio frames. For example, the low-quality audio detection ML model 445 or the multiple speakers detection ML model 450 shown in FIG. 4 can operate in parallel or in series, each ML model receiving a pre-processed portion of the input audio stream and outputting their respective measurements (e.g., probabilities or classifications).

The outputs of the low-quality audio detection ML model 445 or the multiple speakers detection ML model 450 can be received in a suitable format for algorithmic processing by the smoothing subsystem 455 such as an array data structure. In some examples, the smoothing subsystem 455 can operate on "batches" of audio stream portions of a predetermined size. For instance, the batch size may be limited to 20 audio frames. The batch size can be determined based on factors such as the audio stream sampling rate, likelihood of audio quality issues, available computational resources, and so on.

In an example configuration, the batch size may be based on a duration, such as a 5 second portion of the input audio stream. The batch size can then be determined based on an inference rate of the low-quality audio detection ML model 445 and/or the multiple speakers detection ML model 450. For example, for a 5 second duration, if the inference rate of the low-quality audio detection ML model 445 is 250 milliseconds, then the batch size may be 5,000 milliseconds/250 milliseconds=20.

For example, the smoothing subsystem 455 may receive an array of N probability values from the low-quality audio detection ML model 445 corresponding to N portions of the input audio stream. The portions may be, for example, audio frames included in each data packet constituting the input audio stream. Likewise, the smoothing subsystem 455 may receive an array of N classification identifiers from the multiple speakers detection ML model 450, for the same N portions.

At block 1115, the computing system determines if any audio frames remain for processing. For example, if the smoothing subsystem 455 receives N audio frames, the process 1100 can operate on all N audio frames until they are exhausted and then advance to the next batch. Block 1115 in effect checks for completion of the batch. The determination of this block can be made by comparing a frame counter with the predetermined batch size.

At block 1120, responsive to determining that at least one audio frame remains for processing, the computing system determines if the next audio frame includes multiple speakers. For example, the output of the multiple speakers detection ML model 450 may include a classification for the next audio frame that indicates that the next audio frame included multiple speakers. In this case, the audio frame may be omitted from the smoothing computation by proceeding to block 1135. The inclusion of audio frames with multiple speakers may result in an outsize contribution to the audio quality measurement. For instance, an audio stream with multiple speakers may be more likely to result in prediction of an audio quality issue, even in cases where there is no such issue (e.g., a false positive output from the low-quality audio detection ML model 445).

At block 1125, responsive to determining the next audio frame does not include multiple speakers, the computing system adds the audio frame to a smoothing window data structure. The smoothing window may be, for example, a data structure such as an array of audio frames to including the smoothing computation. Other data structures such as vectors, n-tuples, queues, etc. may be alternatively employed.

At block 1130, the computing system increments a single speaker counter. For example, the addition of an audio frame to the smoothing window can be tracked using the single speaker counter. The single speaker counter can be used to limit the growth of the smoothing window data structure to a predetermined smoothing window size. For instance, the smoothing window size may be limited to 15 audio frames. The size of the smoothing window can be determined based on factors such as the audio stream sampling rate, likelihood of audio quality issues, available computational resources, and so on.

At block 1135, the computing system increments a frame counter. The frame counter can be used to determine if any additional audio frames remain in the current batch for processing, as described above in block 1115. Following incrementing of the frame counter, the process 1100 resumes at block 1120.

At block 1140, responsive to determining that no audio frames remains for processing (e.g., the frame counter exceeds the predetermined batch size), the computing system determines if the single speaker counter is greater than or equal to the size of the smoothing window. For example, the size of the single speaker counter can be compared with the predetermined smoothing window size. This check can be used to ensure the voice duration, quantified as a sequence of audio frames, is long enough to obtain a statistically measurement of the audio quality. If the size of the single speaker counter is less than the predetermined smoothing window size, an error condition may be indicated and the process 1100 proceeds to block 1155.

At block 1145, responsive to determining that the single speaker counter is less than the size of the smoothing window, the computing system sorts the audio frames in the smoothing window in descending order. The audio frames in the smoothing can be sorted prior to selecting a predetermined number of audio frames in the following block 1150 prior to computing a smoothing result using a computation technique. A predetermined number of audio frames can be used to prevent temporary or ephemeral fluctuations in speech characteristics, such as a voice gap or voice start/stop, from unduly influencing the smoothing result.

At block 1150, the computing system determines the mean of the top single speaker audio frames in the smoothing window data structure. For example, if the smoothing window data structure is an array including a numerical prediction output by the low-quality audio detection ML model 445 for each respective audio frame, the mean can be determined by summing the contents of the array and then dividing by the size of the array. In some examples, other measures of the smoothing window data structure can be sued, such as the median or mode. Additionally, other approaches to the determination of the mean may be used.

At block 1155, the computing system outputs a smoothing result or an error result. For example, the mean of the top single speaker audio frames in the smoothing window data structure computed in block 1150 can be output as the smoothed audio quality measurement. In this case, the smoothed audio quality measurement corresponds to a probability that the audio quality for the audio frames received during the smoothing window includes low-quality audio.

In some examples, such as when the size of the single speaker counter exceeds the predetermined smoothing window size, the computing system can instead output an error result. For example, the error result may be a negative number (e.g., −1) which is outside the range of the low-quality audio detection ML model 445 output. In some examples, the error result may instead be indicated with a high numerical value, error constant, or by throwing an application exception from program code.

Referring now to FIG. 12, FIG. 12 shows a flowchart of an example method 1200 for metric computation for low-quality audio detection, according to some aspects of the present disclosure. The description of the method 1200 in FIG. 12 will be made with reference to FIGS. 4-9, however any suitable system according to this disclosure may be used, such as the example systems 100 and 200, shown in FIGS. 1 and 2. It should be appreciated that method 1200 provides a particular method for low-quality audio detection. Other sequences of operations may also be performed according to alternative examples. For example, alternative examples of the present disclosure may perform the steps outlined above in a different order. Moreover, the individual operations illustrated by method 1200 may include multiple sub-operations that may be performed in various sequences as appropriate to the individual operation. Furthermore, additional operations may be added or removed depending on the particular applications. Further, the operations described in method 1200 may be performed by different devices. For example, the description is given from the perspective of the audio processing subsystem 420 but other configurations are possible. For instance, these operations or a portion thereof may be performed by a client device 408, 410. One of ordinary skill in the art would recognize many variations, modifications, and alternatives.

Method 1200 depicts an example implementation of some aspects of the analysis subsystem 460 shown in FIG. 4. In particular, method 1200 shows an example implementation of a computation of a metric for a client device for a video conference based on an audio quality measurement.

At block 1205, a computing system receives an indication of an in-progress video conference with a number of connected client devices. For example, the client device 410 depicted in FIG. 4 may be a video conference hardware suite. An administrator may desire to determine the audio quality status of the video conference hardware suite. A suitable UI provided by the video conference provider 402 can be used to configure the audio processing subsystem 420 for computation of a metric for the video conference. This can cause the indication of the in-progress video conference to be output to the analysis subsystem 460 or similar component for computation of the metric.

At block 1210, the computing system determines if the video conference is ongoing. If the process 1200 was just initiated and the computing system has just performed the operation of block 1205, then the video conference is ongoing. Otherwise or in addition, the computing system can determine if the video conference is ongoing using various approaches. For example, the video conference provider 402 may provide a web-based API that can be queried to determine video conference status. In some examples, the video conference can be determined to be ongoing based on the continuous receipt of smoothed audio quality data.

At block 1215, responsive to determining that the video conference is ongoing, the computing system receives a smoothed audio quality measurement. For example, the analysis subsystem 460 or similar component can perform the smoothing operation detailed in FIG. 11 on a number of received audio frames. The output of the smoothing operation may be a scalar value, such as a floating point value between 0 and 1, inclusive, representing an aggregate probability that the single-voice audio frames included in the smoothed window correspond to high-quality audio.

At block 1220, the computing system increments a measurement counter. The measurement counter may be used (e.g., in block 1235 below), to ensure that a sufficiency number of audio quality measurements are available for computation of the metric.

At block 1225, the computing system determines if the smoothed audio quality measurement satisfies a predetermined threshold. For example, the smoothed audio quality measurement may be a probability that the single-voice audio frames included in the smoothed window correspond to high-quality audio. The predetermined threshold may be a floating point value determined according to factors such as the purpose of the video conference (e.g., business or personal), installed hardware, historical audio quality data, and so on. In some examples, the predetermined threshold may be configurable by a system administrator.

In one example, the predetermined threshold is 0.1. In this example, if the smoothed audio quality measurement corresponds to a probability of greater than 10% that the audio frames included in the smoothed window correspond to high-quality audio, then the predetermined threshold is not satisfied.

At block 1230, responsive to determining that the smoothed audio quality measurement satisfies the predetermined threshold, the computing system increments a threshold satisfied counter. The satisfied counter can be used in block 1240 for computation of the audio quality metric.

At block 1235, responsive to determining that the video conference is not ongoing, the computing system determines if the measurement counter satisfies a predetermined threshold. For example, after a certain period of time, the video conference will terminate and the computing system can then compute the metric when sufficient data is available, as measured by the measurement counter. The predetermined threshold may be, for example, a number determined using statistical methods to ensure that the audio quality metric is statistically significant. In the case where the measurement counter does not satisfy the predetermined threshold, processing resumes at block 1245.

At block 1240, responsive to determining that the measurement counter satisfies the predetermined threshold, the computing system computes an audio quality metric for the video conference. In one example, the audio quality metric is computed as a ratio of the threshold satisfied counter to the measurements counter. In this example, the audio quality metric corresponds to the fraction of the time during the video conference that may have experienced low-quality audio, for a particular client device (e.g., a video conference hardware suite).

Following block 1240 or responsive to determining that the measurement counter does not satisfy the predetermined threshold, at block 1245 the computing system outputs the audio quality metric or an error result. The computing system can output the computed ratio from block 1235 or an error result, such as a negative number that corresponds to a value that could not result from the computation technique of block 1235. The audio quality metric can be output to the monitoring subsystem 465 or other downstream consumer.

Figure 13:
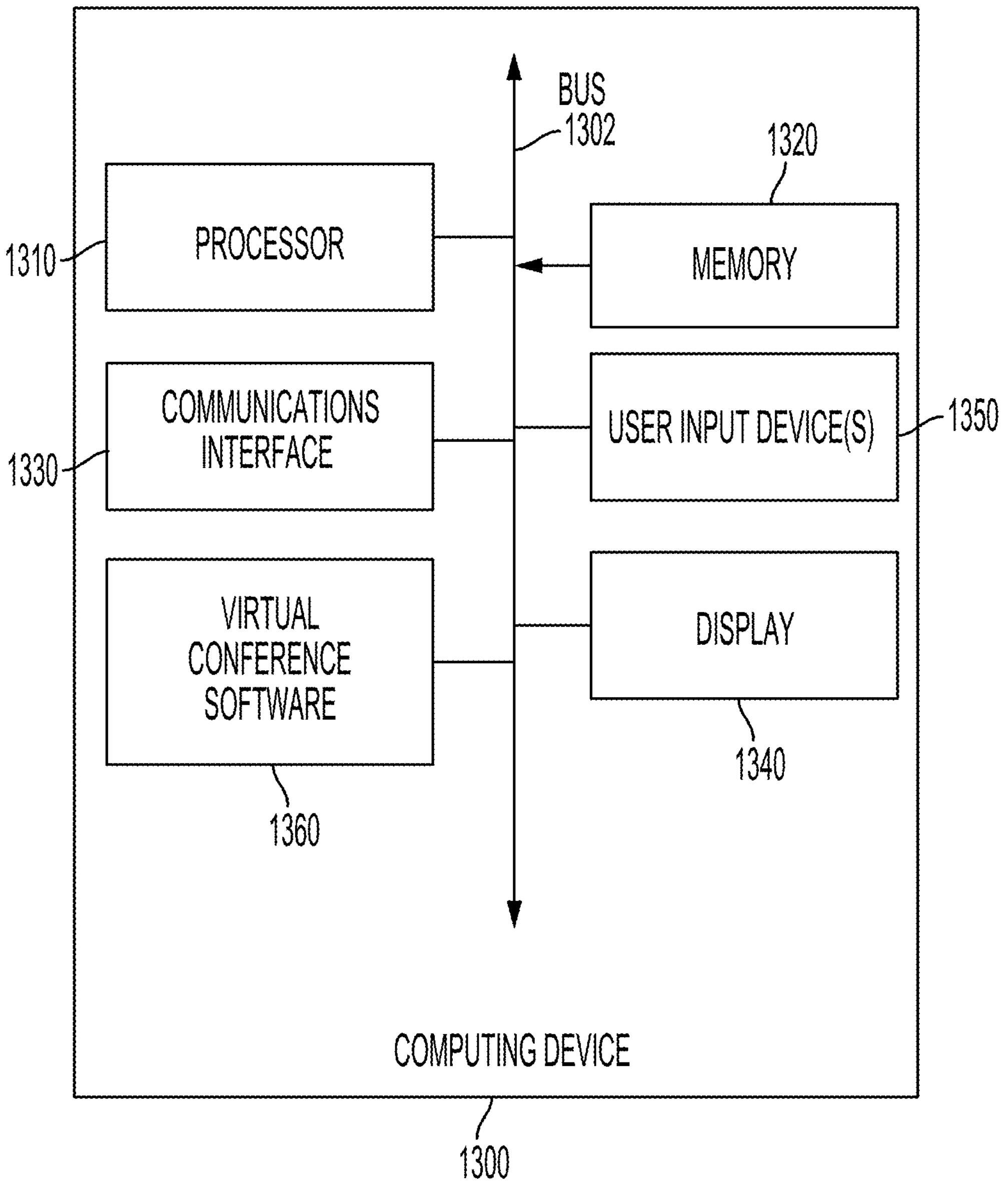
FIG. 13 shows an example computing device suitable for use in example systems or methods for providing low-quality audio detection, according to some aspects of the present disclosure.

Referring now to FIG. 13, FIG. 13 shows an example computing device 1300 suitable for use in example systems or methods for providing low-quality audio detection, according to some aspects of the present disclosure. The example computing device 1300 includes a processor 1310 which is in communication with the memory 1320 and other components of the computing device 1300 using one or more communications buses 1302. The processor 1310 is configured to execute processor-executable instructions stored in the memory 1320 to perform one or more methods for low-quality audio detection according to different examples, such as part or all of the example method 1000, 1100, 1200 described above with respect to FIGS. 10, 11, and 12. The computing device 1300, in this example, also includes one or more user input devices 1350, such as a keyboard, mouse, touchscreen, microphone, etc., to accept user input. The computing device 1300 also includes a display 1340 to provide visual output to a user.

In addition, the computing device 1300 includes virtual conferencing software 1360 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1300 also includes a communications interface 1330. In some examples, the communications interface 1330 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: joining a first client device to a first video conference, a first plurality of client devices connected to the first video conference; receiving, from the first client device, a first audio stream; determining, using a machine learning ("ML") model, at least one first audio quality measurement based on the first audio stream; computing a first metric for the first audio stream based on the at least one first audio quality measurement; and in response to the first metric satisfying a predetermined threshold, outputting a message including first information about a first low-quality audio status associated with the first audio stream.

Example 2 is the method of example(s) 1, further comprising: further in response to the first metric exceeding the predetermined threshold, outputting a command to cause a corrective action to remedy the first low-quality audio status associated with the first audio stream.

Example 3 is the method of example(s) 1, wherein the message further includes one or more recommendations to remedy the first low-quality audio status associated with the first audio stream.

Example 4 is the method of example(s) 1, wherein the first metric is a low-quality audio duration ratio.

Example 5 is the method of example(s) 1, further comprising: joining the first client device to a second video conference, a second plurality of client devices connected to the second video conference; receiving, from the first client device, a second audio stream; determining, using the ML model, at least one second audio quality measurement based on the second audio stream; computing a second metric for the second audio stream based on the at least one second audio quality measurement; computing a third metric for the first client device based on the first metric and the second metric; and in response to the third metric satisfying a second predetermined threshold, outputting a second message including second information about a second low-quality audio status associated with the first client device.

Example 6 is the method of example(s) 5, wherein the first client device is a component of a video conference hardware suite.

Example 7 is the method of example(s) 5, wherein computing the third metric for the first client device based on the first metric and the second metric comprises: receiving a plurality of metrics including the first metric and the second metric; determining a number of metrics of the plurality of metrics that exceed the second predetermined threshold; and computing a ratio of the number of metrics to the number of metrics in the plurality of metrics.

Example 8 is the method of example(s) 1, wherein the ML model comprises a low-quality audio detection model trained to output a low-quality audio probability measurement.

Example 9 is the method of example(s) 8, wherein the ML model is trained using training data comprising a plurality of low-quality audio samples and a plurality of high-quality audio samples.

Example 10 is the method of example(s) 1, wherein the ML model comprises a multiple speakers detection model trained to low-quality audio detection model trained to output a probability measurement that the first audio stream includes multiple voices.

Example 11 is the method of example(s) 1, wherein computing the first metric for the first audio stream based on the at least one first audio quality measurement comprises: receiving a plurality of audio quality measurements including the at least one first audio quality measurement; determining, using a smoothing module, a smoothed audio quality measurement; and determining the first metric based on the smoothed audio quality measurement.

Example 12 is a non-transitory computer-readable medium storing instructions that, when executed by one or more processors, cause the one or more processors to perform operations including: joining a first client device to a first video conference, a first plurality of client devices connected to the first video conference; receiving, from the first client device, a first audio stream; determining, using a ML model, at least one first audio quality measurement based on the first audio stream; computing a first metric for the first audio stream based on the at least one first audio quality measurement; and in response to the first metric satisfying a predetermined threshold, outputting a message including first information about a first low-quality audio status associated with the first audio stream.

Example 13 is the non-transitory computer-readable medium of example(s) 12, wherein the operations further include, in response to the first metric exceeding the predetermined threshold, outputting a command to cause a corrective action to remedy the first low-quality audio status associated with the first audio stream.

Example 14 is the non-transitory computer-readable medium of example(s) 12, wherein the first metric is a low-quality audio duration ratio.

Example 15 is the non-transitory computer-readable medium of example(s) 12, wherein: the ML model comprises a low-quality audio detection model trained to output a low-quality audio probability measurement; and the ML model is trained using training data comprising a plurality of low-quality audio samples and a plurality of high-quality audio samples.

Example 16 is the non-transitory computer-readable medium of example(s) 12, wherein the ML model comprises a multiple speakers detection model trained to low-quality audio detection model trained to output a probability measurement that the first audio stream includes multiple voices.

Example 17 is a system comprising: one or more processors; and one or more computer-readable storage media storing instructions which, when executed by the one or more processors, cause the one or more processors to perform operations including: joining a first client device to a first video conference, a first plurality of client devices connected to the first video conference; receiving, from the first client device, a first audio stream; determining, using a machine learning ("ML") model, at least one first audio quality measurement based on the first audio stream; computing a first metric for the first audio stream based on the at least one first audio quality measurement; and in response to the first metric satisfying a predetermined threshold, outputting a message including first information about a first low-quality audio status associated with the first audio stream.

Example 18 is the system of example(s) 17, wherein the operations further include, in response to the first metric exceeding the predetermined threshold, outputting a command to cause a corrective action to remedy the first low-quality audio status associated with the first audio stream.

Example 19 is the system of example(s) 17, wherein the first metric is a low-quality audio duration ratio.

Example 20 is the system of example(s) 17, wherein: the ML model comprise: a low-quality audio detection model trained to output a low-quality audio probability measurement; and a multiple speakers detection model trained to low-quality audio detection model trained to output a probability measurement that the first audio stream includes multiple voices; and the ML model is trained using training data comprising a plurality of low-quality audio samples and a plurality of high-quality audio samples.

That which is claimed is:

1. A method, comprising:

joining a first client device to a first video conference, a first plurality of client devices connected to the first video conference;

receiving, from the first client device, a first audio stream;

determining, using a machine learning ("ML") model, at least one first audio quality measurement based on the first audio stream, the at least one first audio quality measurement comprising a probability that the first audio stream includes low-quality audio;

computing a first metric for the first audio stream based on the at least one first audio quality measurement; and in response to the first metric satisfying a predetermined threshold, outputting a message including first information about a first low-quality audio status associated with the first audio stream.

2. The method of claim 1, further comprising:

further in response to the first metric exceeding the predetermined threshold, outputting a command to cause a corrective action to remedy the first low-quality audio status associated with the first audio stream.

3. The method of claim 1, wherein the message further includes one or more recommendations to remedy the first low-quality audio status associated with the first audio stream.

4. The method of claim 1, wherein the first metric is a low-quality audio duration ratio.

5. The method of claim 1, further comprising:

joining the first client device to a second video conference, a second plurality of client devices connected to the second video conference;

receiving, from the first client device, a second audio stream;

determining, using the ML model, at least one second audio quality measurement based on the second audio stream;

computing a second metric for the second audio stream based on the at least one second audio quality measurement;

computing a third metric for the first client device based on the first metric and the second metric; and in response to the third metric satisfying a second predetermined threshold, outputting a second message including second information about a second low-quality audio status associated with the first client device.

6. The method of claim 5, wherein the first client device is a component of a video conference hardware suite.

7. The method of claim 5, wherein computing the third metric for the first client device based on the first metric and the second metric comprises:

receiving a plurality of metrics including the first metric and the second metric;

determining a count of the metrics of the plurality of metrics that exceed the second predetermined threshold; and computing a ratio of the count to a total number of metrics in the plurality of metrics.

8. The method of claim 1, wherein the ML model comprises a low-quality audio detection model trained to output a low-quality audio probability measurement.

9. The method of claim 8, wherein the ML model is trained using training data comprising a plurality of low-quality audio samples and a plurality of high-quality audio samples.

10. The method of claim 1, wherein the ML model comprises a multiple speakers detection model trained to low-quality audio detection model trained to output a probability measurement that the first audio stream includes multiple voices.

11. The method of claim 1, wherein computing the first metric for the first audio stream based on the at least one first audio quality measurement comprises:

receiving a plurality of audio quality measurements including the at least one first audio quality measurement;

determining, using a smoothing module, a smoothed audio quality measurement; and determining the first metric based on the smoothed audio quality measurement.

12. A non-transitory computer-readable medium storing instructions that, when executed by one or more processors, cause the one or more processors to perform operations including:

joining a first client device to a first video conference, a first plurality of client devices connected to the first video conference;

receiving, from the first client device, a first audio stream;

determining, using a machine learning ("ML") model, at least one first audio quality measurement based on the first audio stream, the at least one first audio quality measurement comprising a probability that the first audio stream includes low-quality audio;

computing a first metric for the first audio stream based on the at least one first audio quality measurement; and in response to the first metric satisfying a predetermined threshold, outputting a message including first information about a first low-quality audio status associated with the first audio stream.

13. The non-transitory computer-readable medium of claim 12, wherein the operations further include, in response to the first metric exceeding the predetermined threshold, outputting a command to cause a corrective action to remedy the first low-quality audio status associated with the first audio stream.

14. The non-transitory computer-readable medium of claim 12, wherein the first metric is a low-quality audio duration ratio.

15. The non-transitory computer-readable medium of claim 12, wherein:

the ML model comprises a low-quality audio detection model trained to output a low-quality audio probability measurement; and the ML model is trained using training data comprising a plurality of low-quality audio samples and a plurality of high-quality audio samples.

16. The non-transitory computer-readable medium of claim 12, wherein the ML model comprises a multiple speakers detection model trained to low-quality audio detection model trained to output a probability measurement that the first audio stream includes multiple voices.

17. A system comprising:

one or more processors; and one or more computer-readable storage media storing instructions which, when executed by the one or more processors, cause the one or more processors to perform operations including:

joining a first client device to a first video conference, a first plurality of client devices connected to the first video conference;

receiving, from the first client device, a first audio stream;

determining, using a machine learning ("ML") model, at least one first audio quality measurement based on the first audio stream, the at least one first audio quality measurement comprising a probability that the first audio stream includes low-quality audio;

computing a first metric for the first audio stream based on the at least one first audio quality measurement; and in response to the first metric satisfying a predetermined threshold, outputting a message including first information about a first low-quality audio status associated with the first audio stream.

18. The system of claim 17, wherein the operations further include, in response to the first metric exceeding the predetermined threshold, outputting a command to cause a corrective action to remedy the first low-quality audio status associated with the first audio stream.

19. The system of claim 17, wherein the first metric is a low-quality audio duration ratio.

20. The system of claim 17, wherein:

the ML model comprise:

a low-quality audio detection model trained to output a low-quality audio probability measurement; and a multiple speakers detection model trained to low-quality audio detection model trained to output a probability measurement that the first audio stream includes multiple voices; and the ML model is trained using training data comprising a plurality of low-quality audio samples and a plurality of high-quality audio samples.

* * * * *